United States Patent
Such et al.

(10) Patent No.: US 9,902,621 B2
(45) Date of Patent: Feb. 27, 2018

(54) METHOD FOR PRODUCING $SiO_2$ GRANULATE

(71) Applicant: Heraeus Quarzglas GmbH & Co. KG, Hanau (DE)

(72) Inventors: Mario Such, Graefenhainichen (DE); Gerhard Schoetz, Aschaffenburg (DE); Andreas Langner, Freigericht (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 414 days.

(21) Appl. No.: 14/397,484

(22) PCT Filed: Apr. 25, 2013

(86) PCT No.: PCT/EP2013/058585
§ 371 (c)(1),
(2) Date: Oct. 27, 2014

(87) PCT Pub. No.: WO2013/160388
PCT Pub. Date: Oct. 31, 2013

(65) Prior Publication Data
US 2015/0086462 A1  Mar. 26, 2015

(30) Foreign Application Priority Data

Apr. 26, 2012  (DE) ................. 10 2012 008 175

(51) Int. Cl.
*C01B 33/18* (2006.01)
*C03B 19/10* (2006.01)
*C03C 1/02* (2006.01)

(52) U.S. Cl.
CPC ............ *C01B 33/18* (2013.01); *C03B 19/108* (2013.01); *C03C 1/026* (2013.01)

(58) Field of Classification Search
CPC ........ C01B 33/18; C03B 19/108; C03C 1/026
(Continued)

(56) References Cited

U.S. PATENT DOCUMENTS 2,649,388 A * 8/1953 Wills .................... B22C 9/126
                                                      106/204.3
3,401,017 A    9/1968 Burke, Jr.
(Continued)

FOREIGN PATENT DOCUMENTS

DE    2132222 A1 *  1/1972
DE    2840459 A1    3/1980
(Continued)

OTHER PUBLICATIONS

Stieglitz, The Elements of Qualitative Chemical Analysis, 1911, p. 133.*
(Continued)

*Primary Examiner* — James Fiorito
(74) *Attorney, Agent, or Firm* — Tiajoloff & Kelly LLP

(57) ABSTRACT

The invention relates to a process for producing $SiO_2$ granules by freezing and re-thawing an $SiO_2$ suspension, wherein a separation of liquid and sediment composed of agglomerated $SiO_2$ particles occurs in the course of thawing, the liquid removed is decanted and the residual moisture in the sediment is removed by a drying step with formation of the $SiO_2$ granules. According to the invention, an auxiliary comprising alkali metal-free bases in the form of nitrogen hydrides is added to the suspension to set the pH greater than 7.

17 Claims, 2 Drawing Sheets

Figure 1:
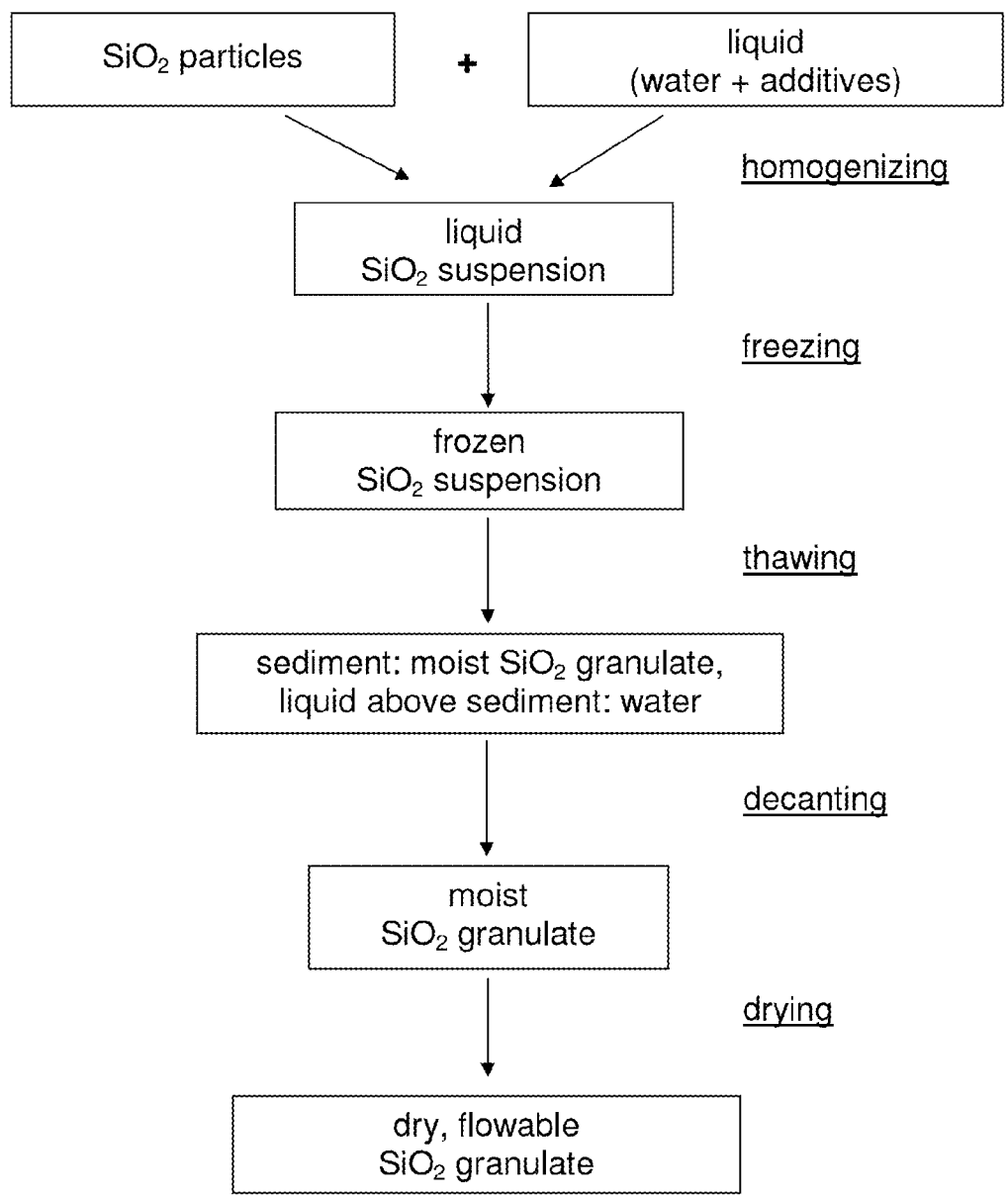

(58) Field of Classification Search
USPC .......................................................... 423/335
See application file for complete search history.

(56) References Cited

U.S. PATENT DOCUMENTS

| | | | |
|---|---|---|---|
| 3,681,017 A | | 8/1972 | Butcher et al. |
| 4,264,564 A | | 4/1981 | Friedmann et al. |
| 5,173,811 A | * | 12/1992 | Gumbs .................. A61F 9/023 |
| | | | 351/213 |
| 7,140,201 B2 | | 11/2006 | Sugiyama et al. |
| 7,662,363 B2 | | 2/2010 | Stanier et al. |
| 8,557,171 B2 | | 10/2013 | Langner et al. |
| 2003/0005724 A1 | | 1/2003 | Sugiyama et al. |
| 2005/0129628 A1 | | 6/2005 | Stanier et al. |
| 2005/0224923 A1 | * | 10/2005 | Daley ................. H01L 21/0335 |
| | | | 257/642 |
| 2010/0251771 A1 | | 10/2010 | Langner et al. |

FOREIGN PATENT DOCUMENTS

| | | |
|---|---|---|
| DE | 41 00 604 C1 | 2/1992 |
| DE | 197 29 505 A1 | 1/1999 |
| DE | 102007045097 A1 | 4/2009 |
| EP | 1256547 A1 | 11/2002 |
| JP | 02-199015 A | 8/1990 |
| RU | 2 295 948 C2 | 3/2007 |
| WO | 03 055802 A1 | 7/2003 |

OTHER PUBLICATIONS

DE 2132222 Machine Translation.*
DE 2132222 Abstract.*
Espacenet English language abstract of DE 19729505 A1, published Jan. 14, 1999.
Espacenet English language abstract of JP H02 199015 A, published Aug. 7, 1990.

* cited by examiner

METHOD FOR PRODUCING SIO₂ GRANULATE

TECHNICAL BACKGROUND OF THE INVENTION

The present invention refers to a method for producing a $SiO_2$ granulate, comprising providing a suspension containing $SiO_2$ particles in an aqueous liquid, freezing the suspension and removing the liquid, wherein the frozen $SiO_2$ suspension is thawed so as to form a liquid phase and a sediment of agglomerated $SiO_2$ particles, the liquid phase is removed and the sediment is dried for removing residual moisture and so as to form the $SiO_2$ granulate.

Furthermore, the present invention refers to a use of the granulate.

PRIOR ART

In ceramic process engineering, various methods are known for producing granulates which can also be used for $SiO_2$ or other glasses. As a rule, a granular mass is produced by removing moisture from a suspension. Pressure and temperature conditions play an essential role. Furthermore, the step of removing moisture can be supported mechanically.

DE 197 29 505 A1 discloses a method for producing a $SiO_2$ granulate, in which an aqueous $SiO_2$ dispersion is homogenized in a stirring tank first under intensive stirring motion and then at a relatively low rotational speed a nitrogen stream which is heated to about 100° C. is acting on the $SiO_2$ dispersion. Moisture is thereby removed and a substantially pore-free $SiO_2$ granulate is obtained in the stirring tank. The method is long-winded and energy-intensive. Moreover, there is the risk of the input of contaminants because the granulating tool and the stirring dish are in a very intensive contact with the $SiO_2$ dispersion throughout the granulating process.

Furthermore, U.S. Pat. No. 3,401,017 discloses $SiO_2$ pigments which are inter alia used as fillers in rubber or plastics. These $SiO_2$ pigments are basically produced in the method steps: freezing and thawing of a $SiO_2$ slurry, and drying of the $SiO_2$ sediment after removal of the liquid phase. With the method according to U.S. Pat. No. 3,401,017 the sedimentation and compaction properties of the $SiO_2$ pigments are to be improved, whereby the drying work is reduced.

JP 02-199015 A also refers to a method in which use is made of an aqueous $SiO_2$ slurry that is frozen and subsequently subjected to a drying step. The thawing operation, followed by sedimentation and concentration of the $SiO_2$ particles in the thawed slurry, is carried out in a "thickener". Drying is then carried out in a filtration drier which is backed up by a hot-air blower and a vacuum pump. At the end of the process one obtains a dry filter cake of synthetic quartz glass.

A method for producing a glass granulate by using a frozen suspension is known from DE 41 00 604 C1. In this method, finely divided glass granulate is produced in that a glass powder of a mean grain size is dispersed and comminuted in an aqueous grinding liquid by using grinding elements of glass. After separation of the grinding elements the glass slurry is deep-frozen and subsequently freeze-dried, the frozen aqueous grinding liquid being evaporated by sublimation in high vacuum. The resulting glass granulate has a mean grain size in the range of 0.5 µm to 3 µm. Smaller granulate grains are only achievable with much longer grinding periods.

Technical Objective

Starting from the said granulation method, it is therefore the object of the present invention to indicate a method for producing a $SiO_2$ granulate which produces a fine granulate of high purity in a particularly simple and economic way.

Furthermore, it is the object of the present invention to indicate a suitable use for the granulate.

GENERAL DESCRIPTION OF THE INVENTION

The above object, starting from a method of the aforementioned type, is achieved according to the invention in that the suspension for adjusting the pH to more than 7 contains an addition of alkali-free bases in the form of nitrogen hydrides.

According to the method of the invention an aqueous $SiO_2$ suspension, also called $SiO_2$ slurry, is first prepared in a container, such as a plastic bottle, it is then deep-frozen and is subsequently re-thawed to room temperature. When the $SiO_2$ suspension is produced, alkali-free bases in the form of nitrogen hydrides are added to the suspension. This additive causes an adjustment of the pH to more than 7 and has the consequence that the hydrate shell around the $SiO_2$ particles is broken up, whereby the suspension gets stabilized and a very homogeneous slurry is maintained also for hours. In this preparation phase, no $SiO_2$ agglomerates from the $SiO_2$ suspension will settle on the bottom of the receptacle. During freezing and during the thawing process, respectively, the original $SiO_2$ particles will agglomerate and settle as a fine granulate on the bottom of the container. The original suspension liquid, i.e. water with the nitrogen hydride additions, is present as a more or less clear liquid phase over the sediment consisting of agglomerated $SiO_2$ particles. Hence, the liquid can be removed without difficulties, e.g. by decanting, suction or centrifugation. What remains as the sediment is the moist $SiO_2$ granulate that must only be subjected to a drying step for eliminating the remaining water. The $SiO_2$ granulate obtained with granulate particle sizes of up to about 700 µm is relatively soft and thereby easily disintegrates into finely divided granulate grains. The $SiO_2$ granulate obtained can also be used without any further comminuting measures. It has further been found that the grain distribution of the $SiO_2$ granulates obtained is shifted in favor of smaller grain sizes due to the addition of nitrogen hydrides to the $SiO_2$ slurry—i.e. the coarse proportion can be minimized.

A stirring tool or another mechanical auxiliary device is not needed for granulation. Freezing and thawing of the slurry can be carried out in the same container in which the slurry formulation has been homogenized, so that the risk of contact contamination with other materials is minimized. The method according to the invention is therefore particularly suited for producing high-purity, doped and non-doped $SiO_2$ granulates.

This procedure for producing a $SiO_2$ granulate is simple, fast and reliable.

The remarkable phase separation in the sediment and liquid phase during thawing is presumably due to the strong volume change during the phase transition ice-water. The $SiO_2$ slurry first represents a colloidal suspension the stability of which is achieved by way of ion occupation on the surface of the $SiO_2$ particles. A sedimentation by allowing the aqueous SiO₂ suspension to stand quiet will therefore only take place after a long time and will then normally lead to a more or less firm "SiO₂ cake", but not to a finely divided granulate. It could be imagined for the method according to the invention that the large dendritic ice crystals which are formed in the freezing process destroy the ion occupation on the surface of the SiO₂ particles and thereby change the tendency to aggregation and the flow properties of the SiO₂ particles, respectively. In the thawing process the SiO₂ particles can then more easily separate from one another or they agglomerate together due to the considerably reduced agglomeration forces into small granulate particles that can easily sediment.

An advantageous configuration of the invention is that the water content of the suspension during freezing is at least 30% by wt. to not more than 90% by wt., preferably at least 70% by wt. This relatively great water amount ensures a good wetting of the SiO₂ particles, so that the large ice crystals can exhibit their action during thawing of the suspension. Moreover, the water ensures a homogeneous slurry in the preparation of the SiO₂ suspension. Since the individual SiO₂ particles in the suspension with a high water content are spaced apart to a relatively great extent, the dopants can be distributed easily in a corresponding manner, thereby permitting a homogeneous doping. Moreover, a SiO₂ suspension with a relatively low solids content yields a rather finely divided granulate.

Furthermore, it has turned out to be advantageous when the SiO₂ suspension is frozen in a temperature range of $-5°$ C. to $-40°$ C. This temperature range represents a suitable compromise between productivity and energy consumption. At a temperature of only shortly below 0° C., the freezing operation for complete thorough freezing of the SiO₂ suspension takes a long time and the method tends to be inefficient. Freezing temperatures of less than $-40°$ C. are certainly possible, but the equipment needed for this is considerable without improving the efficiency of the method according to the invention. The period for freezing the suspension is preferably at least 12 hours, a duration that can be integrated into standard industrial manufacturing sequences.

By addition of nitrogen hydrides, preferably in the form of ammonia ($NH_3$), ammonium carbonate (($NH_4$)$_2CO_3$), Urotropin ($C_6H_{12}N_4$) or ammonium carbamate ($CH_6N_2O_2$), the pH of the suspension can be adjusted to more than 7, preferably between 12 and 14, which has an advantageous effect on the homogeneous distribution thereof when a dopant is added. The above-mentioned auxiliaries help to break up the hydrate shell around the SiO₂ particles, so that the suspension gets stabilized. When dopants are added, these can thus easily deposit on the SiO₂ particles and can be distributed in the suspension.

An addition of one to two volume percent of the nitrogen hydride, preferably concentrated ammonia solution, has turned out to be useful.

It has turned out to be advantageous for the thawing process when this process is carried out in a resting suspension at an ambient temperature ranging from 20° C. to 100° C. At higher temperatures already a part of the aqueous liquid will evaporate, so that a transition phase to the drying step is initiated, which may also be advantageous in individual cases.

To accelerate the thawing process, the frozen SiO₂ slurry may be acted upon with microwaves. The action of low-power microwave radiation reduces the duration for the thawing process.

If the suspension contains soluble impurities, it has turned out to be advantageous when the sediment of agglomerated SiO₂ particles is washed after separation of the liquid phase by way of slurrying in demineralized water. The impurities, e.g. in the form of salts, can thereby be removed easily. This washing operation can be carried out easily because when water is poured onto the sediment a SiO₂ suspension will be formed having SiO₂ particles that sediment at a faster pace and form a sediment again. Thus the washing operation can be carried out within a short period of time even if repeated several times.

As for the drying process for removing the residual moisture in the sediment, it is further advantageous to select a temperature range of 100° C. to 500° C. This temperature range is covered by simple drying cabinets, so that no great efforts with respect to the equipment are needed for the drying step. In principle, it is also possible to supply the sediment consisting of agglomerated SiO₂ particles to a drying segment in a continuous furnace. The temperature which is raised relative to the room temperature leads to a swift drying of the sediment and to the desired SiO₂ granulate.

For a further optimization of the drying step, it has turned out to be advantageous when the sediment is moved mechanically, for instance by slightly shaking the container with the SiO₂ granulate.

It may be helpful for the drying of the sediment to minimize the residual moisture by way of filtration.

To further optimize the drying process, the sediment consisting of agglomerated SiO₂ particles may be centrifuged after removal of the liquid phase so as to separate further aqueous liquid. The centrifuging process shortens the drying period because the liquid contained in the sediment is expelled within a few minutes. Moreover, during the centrifuging process, very tiny suspended particles from the liquid will reliably settle, so that the separation of solid from liquid is optimized.

An advantageous variant of the invention is that the SiO₂ suspension is frozen in a closed container and re-thawed. This measure prevents a possible input of impurities during the freezing and thawing phase.

Advantageously, apart from the SiO₂ particles, the aqueous SiO₂ suspension contains dopants.

The method according to the invention is particularly also suited for the production of doped SiO₂ granulate in the case of which the demands made on the homogeneity of the dopant distribution are very high. This is in general the case with applications in the optical sector. Quartz glasses for passive optical waveguides, laser glasses and filter glasses should here be mentioned by way of example.

In this connection it has also turned out to be useful when as the dopant an oxide, or plural oxides, or a precursor thereof, such as chlorides or fluorides, is used, selected from the following group of elements: Al, B, P, Nb, Ta, Mg, Ga, Zn, Ca, Sr, Ba, Cu, Sb, Bi, Ge, Hf, Zr, Ti and all rare-earth metals.

Since the amount and homogeneous distribution of the dopants is of great importance to the said applications, it is especially the method of the invention based on frost granulation that is suited because the risk of the input of external elements, which elements might destroy the effect to the selectively used dopants, is minimized.

The SiO₂ granulate obtained according to the method of the invention is distinguished by a particle size of the granulate particles in the range of less than or equal to 700 μm. These granulates are soft and decompose under only slight pressure into smaller aggregates. This may be of advantage during further processing because upon crushing of the soft granulate grains the granulate is subjected to further thorough mixing.

The $SiO_2$ granulate produced according to the method of the invention is particularly suited as a start substance for optically active materials for laser-active components, such as fiber lasers, rod lasers or disk lasers. Furthermore, these $SiO_2$ granulates are suited as start substance for filter glasses or for producing the synthetic inner layer in quartz glass crucibles during melting of silicon. Apart from this, the production of components from quartz glass for use in dry etching processes of the semiconductor industry should be mentioned as an application for the $SiO_2$ granulates produced according to method according to the invention. These possibilities of use are particularly given if dopants have been added to the $SiO_2$ suspension. The homogeneous dopant distribution is also maintained in the granulate, whereby optimal further processing possibilities are given.

EMBODIMENT

Figure 2:
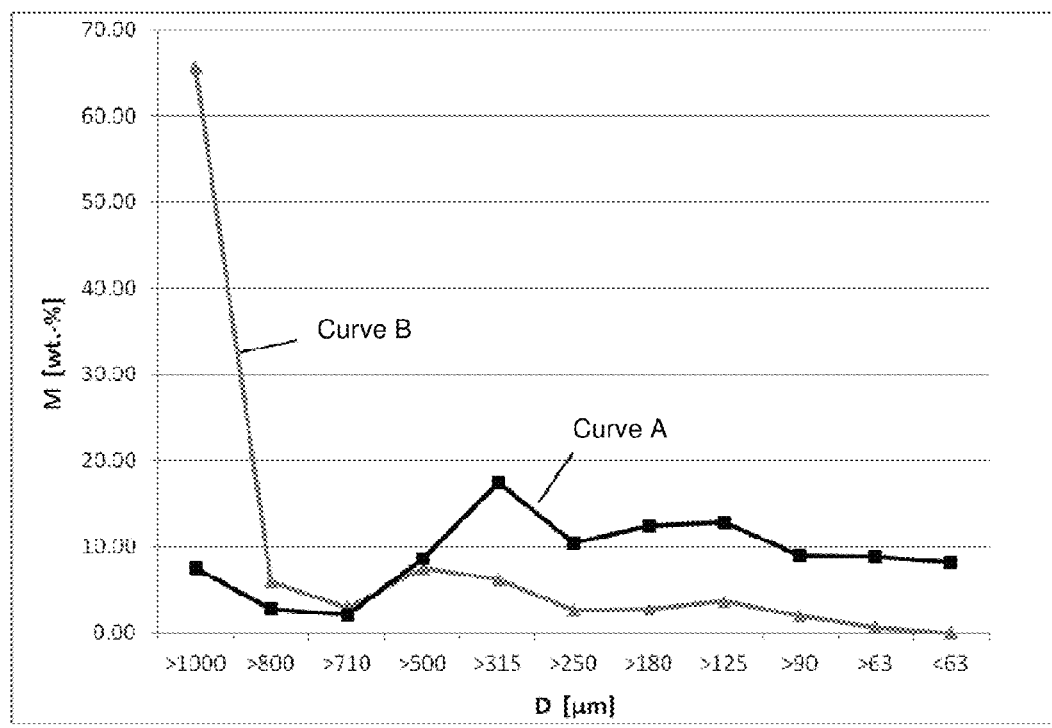

The invention shall now be explained in more detail with reference to an embodiment and the drawings, in which FIG. 1 shows a flow diagram with method steps for explaining the production of $SiO_2$ granulate according to the invention; and FIG. 2 shows a sieve analysis of the $SiO_2$ granulate produced.

EXAMPLE 1

For the production of a $SiO_2$ granulate a suspension consisting of discrete $SiO_2$ particles in the form of $SiO_2$ aggregates is prepared in demineralized water in a closable plastic container, e.g. a PTFE bottle with lid. This $SiO_2$ suspension is fed drop by drop with a concentrated ammonia solution, resulting in a pH of 9.5.

The $SiO_2$ aggregates in the slurry have a mean particle size of about 10 μm and they consist of $SiO_2$ primary particles with particle sizes in the range of 5 nm to 100 nm.

The solids content of the $SiO_2$ suspension is 12% by wt. For homogenization the $SiO_2$ suspension is thoroughly stirred for several hours, resulting in a stable homogeneous $SiO_2$ suspension in the end. The bottle with the suspension is closed by a lid or by a suitable foil and is subsequently deep-frozen overnight in a freezer at −18° C. For thawing the container with the frozen $SiO_2$ suspension is taken from the freezer and thawed at room temperature.

During thawing the agglomerated $SiO_2$ particles separate as sediment from the water, so that the sediment is present in the lower half of the container and, above this sediment, the water as a more or less clear liquid.

The liquid is subsequently poured off. The residual water remaining in the sediment can be evaporated by drying the sediment at 120° C. in a drying cabinet. This drying step can be accelerated by slightly shaking e.g. the container with the moist sediment.

An alternative method for accelerating the drying process consists in putting the moist sediment of agglomerated $SiO_2$ particles into a centrifuge. At a rotational speed of 500 rpm one obtains, depending on the weighed-in amount and the performance of the centrifuge, an almost fully dried $SiO_2$ granulate after about 5 minutes. Unless the remaining residual moisture is even helpful in the further processing of the granulate, it can be removed by slight heating within a very short period of time.

FIG. 2 shows the result of the sieve analysis according to the method according to DIN 66165-2 of the granulate obtained thereby in comparison with the $SiO_2$ granulate according to Comparative Example 2. The relative percentage amount M (based on the total mass in weight percent) is plotted against the grain size D in μm of the $SiO_2$ granulates. Curve A shows the grain distribution of the $SiO_2$ granulate produced according to the invention at a residual moisture of about 40% as compared with a $SiO_2$ granulate which has been prepared by way of frost granulation, but without the addition of nitrogen hydrides to the initial $SiO_2$ suspension (Curve B). It has been found that the $SiO_2$ granulate produced according to the invention has a great fraction of grain sizes in the range of 300 μm to 600μ, whereas the $SiO_2$ granulate produced without addition of a nitrogen hydride to the $SiO_2$ slurry has a very great coarse fraction of granulates of more than 800 μm.

The addition of nitrogen hydrides to the $SiO_2$ slurry has then an impact on the grain distribution of the resulting $SiO_2$ granulates in favor of smaller grain sizes, thereby reducing the prevailing coarse fraction. The grain size distribution is on the whole broader and more homogeneous. This confirms that the method according to the invention is suited for providing particularly finely divided $SiO_2$ granulates.

The $SiO_2$ granulate produced according to the invention is suited for use in the manufacture of high-purity quartz glass.

EXAMPLE 2

Starting from the aqueous $SiO_2$ suspension of Example 1 this slurry is adjusted to a pH of 9.5 by adding a concentrated ammonia solution drop by drop. Thereafter, the homogenized alkaline $SiO_2$ suspension is fed under constant stirring with dopants in dissolved form and by way of time-controlled dropwise addition of an aqueous dopant solution consisting of $AlCl_3$ and $YbCl_3$.

As described in Example 1, this slurry that is now doped is subsequently frozen and re-thawed. In this case, too, the solid forms a sediment during thawing, and the ammoniacal liquid is positioned thereabove, which liquid will be decanted. The sediment contains ammonium chloride ($NH_4Cl$) from the reaction of the ammonia with the dopants. The ammonium chloride can either be sublimed at correspondingly high drying temperatures or washed out. For the washing operation, demineralized water is put on the sediment, the wet granulate settles again as sediment after a short period of time and the dissolved ammonium salts are removed by pouring off the supernatant liquid. After the initial freezing and thawing process the $SiO_2$ particles, no matter whether they are doped or undoped, show a strong tendency to sedimentation, so that this washing operation can be repeated several times in case of need and is not time-consuming.

The granulate obtained thereby is particularly suited for the further processing into components of optically active materials for laser-active components, such as e.g. fiber lasers or for producing quartz glass for use in dry etching processes.

Comparative Example 1

A $SiO_2$ suspension according to Example 1 is not frozen, but left to stand in a resting position for several days. There is no separation of $SiO_2$ particles and aqueous liquid. For the removal of the water the slurry is dried in a drying cabinet at 120° C. for 24 hours.

What remains is a firm "SiO$_2$ cake" which is ground with a mortar by hand into a coarse splintery granulate. Moreover, due to treatment with the mortar there is an increased risk of the input of contaminants into the SiO$_2$ granulate.

Comparative Example 2

An aqueous SiO$_2$ suspension of discrete SiO$_2$ particles in the form of SiO$_2$ aggregates is produced in demineralized water in a closable plastic container, e.g. a PTFE bottle with lid. Subsequently, the SiO$_2$ suspension is frozen in a freezer without addition of a nitrogen hydride. During thawing at room temperature the agglomerated SiO$_2$ particles separate as sediment from the water, so that the sediment is present in the lower half of the container and, above this sediment, the water as a more or less clear liquid.

The liquid is subsequently poured off. The residual water remaining in the sediment can be evaporated by drying the sediment at 120° C. in a drying cabinet.

The SiO$_2$ slurry without addition of nitrogen hydrides yields a relatively hard SiO$_2$ granulate which is partly also present in small lumps. The grain analysis according to FIG. 2, Curve B, shows a great coarse fraction of up to 65% for grain sizes between about 800 μm and >1000 μm in comparison with granulates the starting material of which was a SiO$_2$ slurry with addition of ammonia as nitrogen hydride (FIG. 2 Curve A).

The invention claimed is:

1. A method for producing a SiO$_2$ granulate, said method comprising:
   providing a suspension containing SiO$_2$ particles in an aqueous liquid,
   freezing the suspension and removing the liquid, including thawing the frozen SiO$_2$ suspension so as to form a liquid phase and a sediment of agglomerated SiO$_2$ particles,
   removing the liquid phase and drying the sediment so as to remove residual moisture and so as to form the SiO$_2$ granulate,
   wherein the suspension contains an addition of nitrogen hydrides such that the suspension has a pH more than 7, and
   wherein the suspension is frozen for a period of at least 12 hours.

2. The process according to claim 1, wherein the water content of the suspension during freezing is at least 30% by wt. and not more than 90% by wt.

3. The process according to claim 1, wherein the SiO$_2$ suspension is frozen in a temperature range of −5° C. to −40° C.

4. A process comprising:
   producing a SiO$_2$ granulate according to a method comprising:
   providing a suspension containing SiO$_2$ particles in an aqueous liquid,
   freezing the suspension and removing the liquid, including thawing the frozen SiO$_2$ suspension so as to form a liquid phase and a sediment of agglomerated SiO$_2$ particles,
   removing the liquid phase and drying the sediment so as to remove residual moisture and so as to form the SiO$_2$ granulate,
   wherein the suspension contains an addition of nitrogen hydrides such that the suspension has a pH more than 7, and
   wherein, apart from SiO$_2$ particles, the aqueous SiO$_2$ suspension also contains dopants, and the dopants include
   an oxide, oxides, or a precursor of an oxide or oxides, of Al, and
   an oxide, oxides, or a precursor of an oxide or oxides, of one of the rare-earth metals; and
   using the SiO$_2$ granulate as a starting material for an optically active material for laser-active component.

5. The process according to claim 4, wherein ammonia (NH$_3$) or ammonium carbonate ((NH$_4$)$_2$CO$_3$) or Urotropin (C$_6$H$_{12}$N$_4$) or ammonium carbamate (CH$_6$N$_2$O) is added as nitrogen hydride.

6. The process according to claim 4, wherein nitrogen hydride is added to the aqueous liquid in such an amount that a pH of the suspension is in the range of 9.5 to 14.

7. The process according to claim 4, wherein after the removing of the liquid phase the sediment of agglomerated SiO$_2$ particles is washed by being slurried in demineralized water.

8. The process according to claim 4, wherein the drying step of the sediment is carried out in a temperature range of 100° C. to 500° C.

9. The process according to claim 4, wherein the sediment is moved while being dried.

10. The process according to claim 4, wherein the removing of the liquid phase comprises decanting and subsequent centrifuging of the sediment of agglomerated SiO$_2$ particles so as to produce separation of further aqueous liquid.

11. The process according to claim 4, wherein the SiO$_2$ suspension is frozen in a closed container.

12. The process according to claim 4, wherein the SiO$_2$ granulate is of granulate particles having a particle size up to 500 μm.

13. The process according to claim 4, wherein the water content of the suspension during freezing is at least 70% by wt and not more than 90% by wt.

14. The process according to claim 4, wherein nitrogen hydride is added to the aqueous liquid in such an amount that the pH of the suspension is more than 12.

15. The process according to claim 4, wherein the suspension is frozen for a period of at least 12 hours.

16. The process according to claim 4, wherein the water content of the suspension during freezing is at least 30% by wt. and not more than 90% by wt.

17. The process according to claim 4, wherein the SiO$_2$ suspension is frozen in a temperature range of −5° C. to −40° C.

* * * * *